United States Patent
Allen

[11] Patent Number: 6,150,681
[45] Date of Patent: Nov. 21, 2000

[54] MONOLITHIC FLOW SENSOR AND PRESSURE SENSOR

[75] Inventor: Henry V. Allen, Fremont, Calif.

[73] Assignee: Silicon Microstructures, Inc., Fremont, Calif.

[21] Appl. No.: 09/129,198

[22] Filed: Jul. 24, 1998

[51] Int. Cl.[7] .................................................. H01L 29/82
[52] U.S. Cl. ........................ 257/254; 257/417; 257/418; 257/419; 438/53; 73/204.26; 73/279; 73/721; 73/727; 73/861.47
[58] Field of Search ..................................... 257/254, 417, 257/418, 419; 73/204.26, 204.24, 861.47, 718, 721, 724, 727, 279, 274; 438/53

[56] References Cited

U.S. PATENT DOCUMENTS

| | | | |
|---|---|---|---|
| 5,116,331 | 5/1992 | Chapman | 73/721 |
| 5,353,638 | 10/1994 | Marek | 73/204.26 |
| 5,522,267 | 6/1996 | Lewis | 73/726 |
| 5,629,538 | 5/1997 | Lipphardt et al. | 257/254 |
| 5,683,594 | 11/1997 | Hocker et al. | 216/33 |
| 5,723,784 | 3/1998 | Lembke et al. | 73/204.26 |
| 5,780,748 | 7/1998 | Barth | 73/861.47 |
| 5,945,605 | 8/1999 | Julian et al. | 73/727 |

FOREIGN PATENT DOCUMENTS 406050783  2/1994  Japan.

*Primary Examiner*—William Mintel
*Attorney, Agent, or Firm*—Townsend & Townsend and Crew LLP

[57] ABSTRACT

A monolithic, integrated circuit sensor combining both a differential pressure sensor and a flow sensor on the same silicon chip. The integrated circuit has a diaphragm with a number of piezo-resistive elements placed on it in the normal manner for a pressure sensor. In addition, a channel is provided between the spaces on the two sides of the diaphragm. The channel has a cross-section which is a fraction of the size of the diaphragm. In one embodiment, the channel is a hole in the diaphragm. In another embodiment, the channel is an etched groove in the frame supporting the diaphragm.

10 Claims, 3 Drawing Sheets

MONOLITHIC FLOW SENSOR AND PRESSURE SENSOR

BACKGROUND OF THE INVENTION

The present invention relates to flow sensors and pressure sensors, and in particular to such sensors incorporated in an integrated circuit formed on a silicon chip.

Flow, either fluid or gas flow, can be sensed in several different ways. One of these is to provide a suspended wire in the fluid path and measure the amount of heat removed as a function of time. This then produces a signal which can be converted to a flow signal. A second approach is to actually heat up the fluid with a heater and then to measure the heat increase with a sensor element. The advantage of these types of flow sensors is that the flow output is relatively linear with heat removal.

A second approach to flow measurement is to measure the pressure drop across a flow restriction. This is a classic method of measuring flow. In this case, a differential pressure sensor is connected across the restriction and the pressure difference is proportional to the square of the flow per Bernoulli's Theorem. Classically, this has been done in integrated circuit technology with a precision flow channel using a V-groove etching technology in <100> silicon. Channel lengths of several hundred millimeters have been achieved with widths in the 10 to 50 μm range.

Pressure sensors can use a variety of structures. A typical structure is the use of a diaphragm which is exposed to one pressure on one side and a control pressure on the other. The flexing of the diaphragm is then measured and correlated to the pressure. This type of sensor can be incorporated in a silicon integrated circuit using etching techniques, with, as one example, piezo-resistive elements formed on the diaphragm. The resistive elements will vary their resistance in accordance with the stress placed on the diaphragm, allowing measurement of the pressure with an electrical circuit. Alternately, a chip could be bonded to the top of the sensor and capacitive changes could be measured instead of piezoresistive changes.

A combined approach to measuring fluid flow and differential pressure has been implemented using discrete components. This is illustrated in FIG. 1, which conceptually shows the operation. A flow restrictor 10 provides a restricted flow path, while a differential pressure sensor 12 is positioned between pressures P1 and P2. A measurement of the pressure can be done which will take into account both the differential pressure and the fluid flow. The output voltage of an electrical circuit measuring differential pressure would be represented by the following equation:

$$Vout = k^*(P_1 - P_2)$$

where P1 and P2 are the two pressures, k is a constant, and Vout is the measured voltage.

It would be desirable to implement such a structure in a single integrated circuit.

SUMMARY OF THE INVENTION

The present invention provides a monolithic, integrated circuit sensor combining both a differential pressure sensor and a flow sensor on the same silicon chip. The integrated circuit has a diaphragm with a number of piezo-resistive elements placed on it in the normal manner for a pressure sensor. In addition, a channel is provided between the spaces on the two sides of the diaphragm. The channel has a cross-section which is a fraction of the size of the diaphragm.

In one embodiment, the channel is a hole in the diaphragm. In another embodiment, the channel is an etched groove in the frame supporting the diaphragm. Preferably, the groove is a V-shaped groove, and is formed in <100> silicon. The groove could also be formed in the substrate.

Precision control of the channel length and width is not necessary because the sensor can be calibrated using a standard temperature calibration circuit used for a pressure sensor. The same calibration circuit can be used for both the pressure and flow aspects of the sensor.

For a further understanding of the nature and advantages of the invention, reference should be made to the following description taken in conjunction with the accompanying drawings.

DETAILED DESCRIPTION OF THE INVENTION

Figure 1:
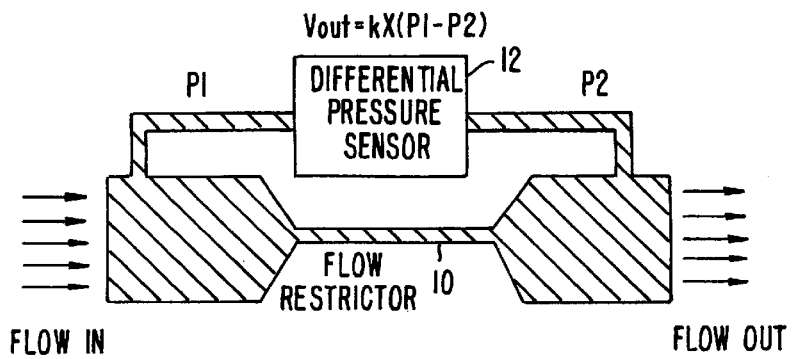
FIG. 1 is a diagram illustrating conceptually a flow restrictor and differential pressure sensor according to the prior art.
Figure 2A:
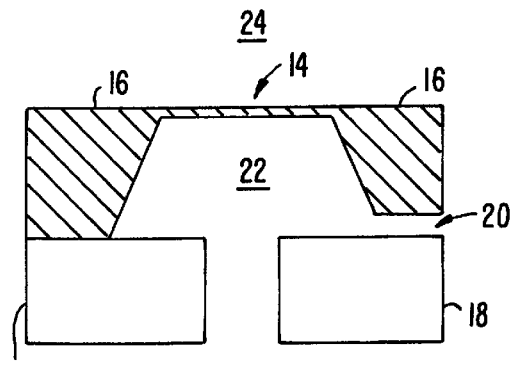
FIG. 2A is a cross-sectional view of one embodiment of the monolithic pressure sensor and flow restrictor of the invention.

FIG. 2A is a side sectional view of one embodiment of a monolithic integrated circuit according to the present invention. FIG. 2A shows a differential pressure diaphragm 14 supported by a frame 16. Frame 16 is mounted on a substrate 18. A flow channel 20 is provided between frame 16 and substrate 18. Although not visible in this view, flow channel 20 will interconnect an inner space 22 on one side of diaphragm 14 to an outer space 24 on the other side of diaphragm 14.

Figure 2B:
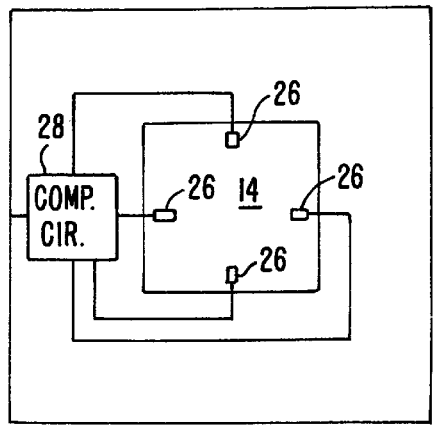
FIG. 2B is a top view of the sensor of FIG. 2A, illustrating the electrical connections.

FIG. 2B illustrates a top view of the sensor of FIG. 2A. Shown on diaphragm 14 are 4 piezo-resistive elements 26, which measure the pressure differential in a standard pressure sensor. In the embodiment of FIG. 2A, they measure the combined pressure differential and flow effects. The resistor elements 26 are connected to a temperature compensation circuit 28, as discussed in more detail later.

Figure 3A:
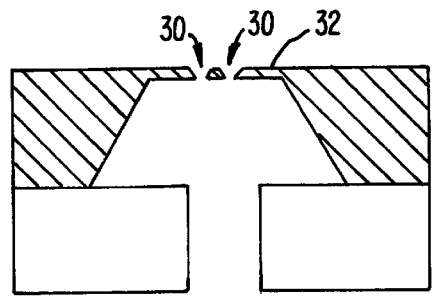
FIGS. 3A and 3B are cross-sectional views of alternate embodiment of the sensor of FIGS. 2A and 2B.

FIG. 3A shows an alternate embodiment from that of FIG. 2A, in which, instead of flow channel 20, holes 30 are provided in a diaphragm 32.

Figure 3B:
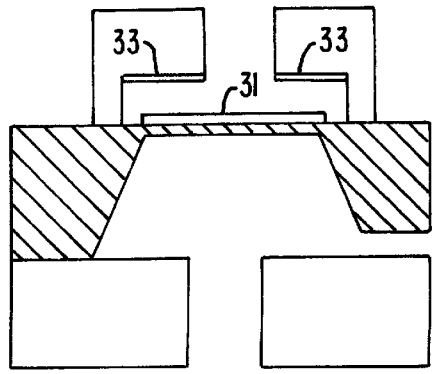

FIG. 3B shows another alternate embodiment using a capacitive sensor instead of piezoresistive elements. The structure shown is similar to that of FIG. 2B, except for capacitor electrodes 31 and 33. As the diaphragm moves, electrode 31 will also move, varying the distance from electrode 33 and thus varying the capacitance.

The structure of the invention is thus a silicon pressure sensor with either a precision hole formed in the diaphragm of the sensor, or a groove etched in the backside of the sensor in the area classically referred to as the frame, between the diaphragm cavity and the outside edge of the die. One feature of this new device is that the flow sensor function can be formed simply in a conventional pressure sensor. Further, the part can be easily mounted in conventional pressure sensor cases. In addition, while the output is non-linear with flow, the device can be zeroed and calibrated over temperature in the same packaged sensor structure realized for standard pressure sensors. Thus, the flow sensor device becomes a simple extension of the silicon pressure sensor. The device structures (flow channel and pressure sensor) are both provided. The differential pressure can then be used to compute the flow. This can be accomplished with a known flow restriction that is determined during calibration. While a number of approaches can be used, two approaches are detailed below.

Figure 4A:
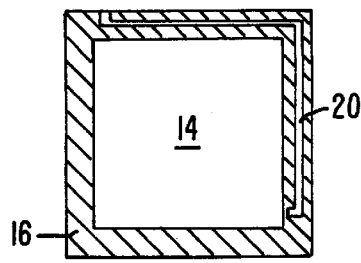
FIGS. 4A–4D are diagrams illustrating various process fabrication steps for forming the channel illustrated in FIGS. 2A and 2B.

FIGS. 4A–4D show a sequence for forming the device of FIG. 2A. FIG. 4A shows the backside of the integrated circuit with a nitride/oxide coated back surface. The back is then patterned with a composite of the proposed channel 20 and the back cavity pattern for the diaphragm 14. Nitride is removed down to the oxide in the composite areas.

Figure 4B:
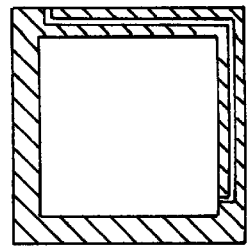
Figure 4C:
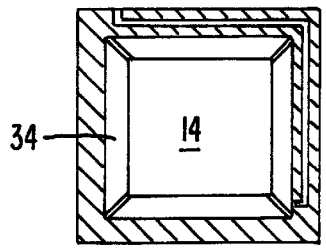

Next, as illustrated in FIG. 4B, the diaphragm area alone is etched with a standard KOH etch, while the channel area 20 is protected. When the diaphragm is approximately 50 to 100 μm thick, the wafer has a dip-lithography done to expose the channel pattern previously defined in the oxide. FIG. 4C illustrates the diaphragm area partially etched showing the diaphragm area 14 and the etched, angled wall 34 of the diaphragm cavity.

Figure 4D:
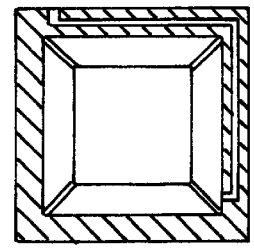

The final step, as illustrated in FIG. 4D, has the channel oxide cleared and the diaphragm etched to the final thickness, while concurrently creating a V-shaped groove. Alternately, by carefully setting the oxide thickness, the oxide consumption in KOH can be used to automatically expose the channel silicon. Once the channel silicon is exposed, then the KOH is used to continue the diaphragm and concurrently etching the V-shaped groove etched as it defines the precise channel.

While a typical flow restrictor structure would require precision control of the channel length and width, that is not necessary in the present invention. The pressure sensor itself has sensitivity uncertainties in the range of ±30% of nominal. These uncertainties are accounted for by calibrating using a calibration circuit as discussed later. The same calibration circuit can be used to compensate for variations in the channel length and width of the flow restrictor, thus eliminating the need for precise control of the flow restrictor structure. This simplifies the control issues for the device, and also the required processing.

When the final device as shown in FIG. 4D is completed, the full sensor element is formed by bonding a glass substrate (using anodic bonding) to the bottom side of the silicon substrate (the side shown face up in FIG. 4D). This glass has a hole in it directly in line with the diaphragm. The wafer is then diced into individual elements and the channel is opened to the upper surface of the die during the dicing process.

An alternative substrate to glass, such as silicon, can be bonded to the backside of the pressure sensor using such techniques as silicon fusion bonding. Silicon fusion bonding typically requires high temperature processing, which usually means that the final sensor metalization has to be added after the bonding step, although there are other options.

The alternative substrate must have a through-hole to allow flow from the back-most side of the sensor structure up to the pressure cavity. If the alternate substrate is silicon, the precision channel can be etched into this substrate using a KOH (or similar) etch. This latter approach means that the silicon pressure sensor structure is essentially untouched as the flow channel is in the substrate bonded to the pressure sensor structure. While glass could be etched and bonded to the pressure sensor structure, in general, due to the lack of precise control of channel width and depth, this is not the most preferred approach to realizing micromachined flow channels.

A second implementation of the flow sensor utilizes a small orifice in the diaphragm of the pressure sensor (FIGS. 5A–5D). This approach requires either a KOH etch from the top side or a plasma etch. The diaphragm is thinned down to the appropriate thickness and then the top side is protected while a secondary pattern is defined. One or more small holes are etched into the top surface in an area away from the sensing resistors. The size, shape and multiplicity of holes set the flow restriction in this nozzle type approach.

Figure 5A:
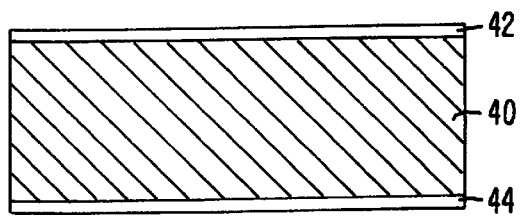
FIGS. 5A–5D are cross-sectional views illustrating various process steps for forming a channel in the diaphragm as illustrated in FIG. 3.
Figure 5B:
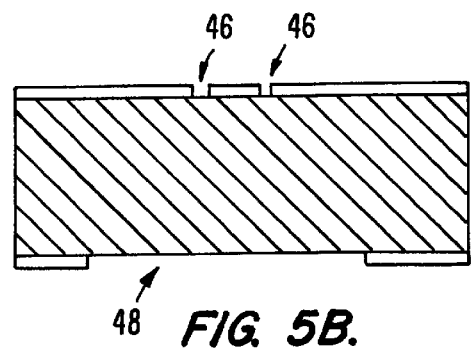

FIGS. 5A–5D are cross-sectional views illustrating the formation of a combined pressure and flow sensor with holes in the diaphragm. FIG. 5A illustrates the starting silicon substrate 40 with dielectric layers 42 and 44 on the top and bottom, respectively. FIG. 5A illustrates the hole or nozzle pattern 46 being formed on the top, and the cavity pattern 48 being formed on the bottom.

Figure 5C:
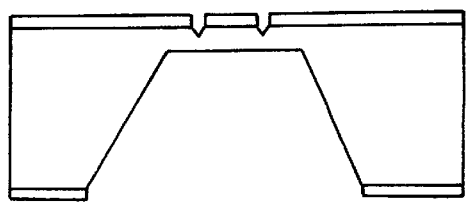
Figure 5D:
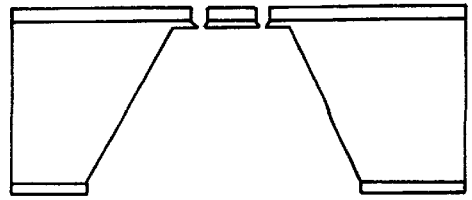

FIG. 5C illustrates the wafer when the etch is partially complete. Note that the top side nozzles can be passivated with oxide or nitride at this point to prevent etching when the back and front etches meet. FIG. 5D shows the final nozzle configuration after back-etch meets the front etch.

This nozzle implementation compares to the backside flow channel where the length also enters into the total flow resistance calculations. In general, the backside approach provides higher precision in setting the flow resistance although the optimum approach may be set by the allowed pressure drop and the needed flow rate through the sensor. Because the sensor needs to be calibrated, some latitude in channel precision is possible, but flow restriction is strongly dependent on channel cross-section, so small changes in the cross-section have a major impact on the flow restriction.

The top side orifice device is bonded to a glass wafer using a similar approach to the backside channel device. The silicon is diced into individual elements to complete the basic sensor element.

Once the individual die are separated, then the sensor can be mounted down into any number of packages using conventional die-down approaches. In the specific case of wanting a sensor suitable for flow measurements with a temperature independent output, the device can be mounted down onto a ceramic substrate using a conventional die attach for pressure sensors, such as silicon rubber. Wire bonds then connect the piezo-resistive elements formed on the silicon diaphragms down to the substrate.

Figure 6A:
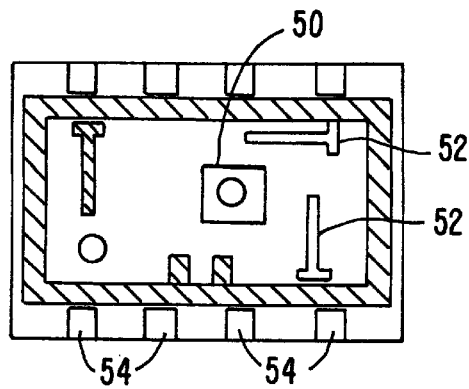
FIGS. 6A and 6B are top and side cross-sectional views illustrating a hybrid module incorporating a sensor according to the invention.

FIG. 6A is a top view of one embodiment of a hybrid flow module. The flow sensor 50 is shown in the middle, with laser trim resistors 52 for the calibration circuit, described below, being mounted in the package as well. At the bottom are the electrical input and output pads 54.

Figure 6B:
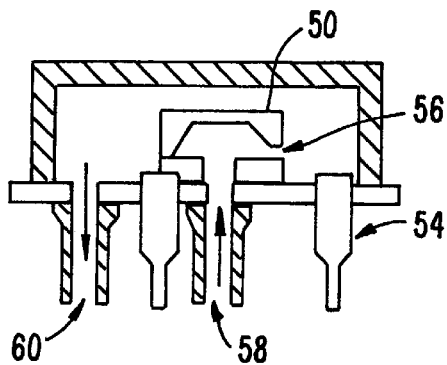

FIG. 6B is a side view of the module of FIG. 6A. Shown in the side view is the restrictor channel 56 in flow sensor 50 with a flow input path 58 and a flow output path 60 being shown.

Figure 7:
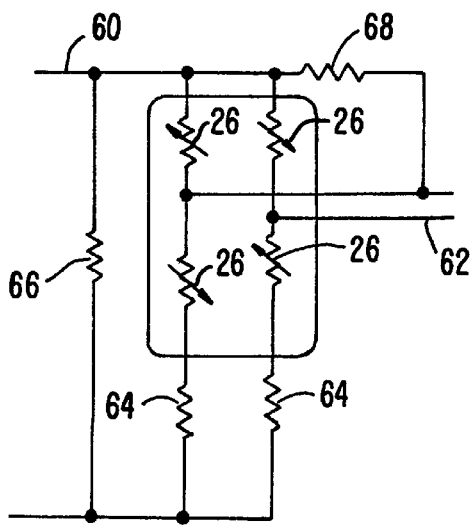
FIG. 7 is a circuit diagram of one example of a compensation network for use with the sensor of the present invention.

The part is tested at zero and some flow rate at two or more temperatures and then a simple compensation network, such as that shown in FIG. 7, can be used to provide a temperature compensated part accurate in flow at zero and the measured flow rate and the output is proportional to the square of the pressure drop according to Bernoulli's Theorem. One feature of this approach is that, except for the non-linear flow to pressure transfer, the identical circuitry used to compensate a pressure sensor over temperature can be used in this case. Note that except for the temperature dependent flow parameters, such as viscosity, the sensor will calibrate out in a very similar fashion to that of a pressure sensor.

FIG. 7 illustrates a circuit primarily intended for constant current excitation. The circuit has a sensor input 60 from a current source and a sensor output 62. A pair of zero trim resistors 64 are provided, along with a trim resistor 66 for providing temperature compensation of sensitivity. Another resistor 68 is a trim resistor to provide temperature compensation of zero. In the center of the circuit are shown the piezo-resistive elements 26.

Resistors 66, 68 and 64 can be selected to provide the necessary compensation after measuring at two flows (or pressures in prior art uses) and two temperatures to give 4 data points. Because the viscosity of air does not significantly change over temperature, the same passive compensation network can be used for a flow sensor as is used for a pressure sensor.

As will be understood by those of skill in the art, the present invention may be embodied in other specific forms without departing from the essential characteristics thereof. Accordingly, the foregoing description is intended to be illustrative, but not limiting, of the scope of the invention which is set forth in the following claims.

What is claimed is:

1. An integrated circuit sensor comprising:
   a diaphragm having first and second sides in contact with first and second spaces, respectively;
   a sensing element on said diaphragm; and
   a channel extending from said first space to a position providing gas flow to said second space, said channel having a cross-section which is a fraction of an area of said diaphragm.

2. The integrated circuit of claim 1 wherein said channel comprises a hole in said diaphragm.

3. The integrated circuit of claim 1 further comprising:
   a frame supporting said diaphragm; and
   wherein said channel comprises a groove etched in said frame.

4. The integrated circuit of claim 3 wherein said groove is V-shaped.

5. The integrated circuit of claim 1 wherein said integrated circuit is formed from <100> silicon.

6. The integrated circuit of claim 1 further comprising a temperature compensation circuit of the type designed for pressure sensors, coupled to said sensing element, for compensation for flow measurements.

7. The integrated circuit of claim 1 wherein said sensing element is a plurality of piezoresistive elements.

8. The integrated circuit of claim 1 wherein said sensing element is a capacitive element.

9. An integrated circuit sensor comprising:
   a diaphragm having first and second sides in contact with first and second spaces, respectively;
   a plurality of piezoresistive elements on said diaphragm;
   a channel extending from said first space to a position providing gas flow to said second space, said channel having a cross-section which is a fraction of an area of said diaphragm;
   a frame supporting said diaphragm; and
   a temperature compensation circuit, coupled to said piezoresistive elements, for compensation for flow measurements;
   wherein said channel comprises a V-shaped groove etched in said frame; and
   wherein said integrated circuit is formed from <100> silicon.

10. The integrated circuit sensor of claim 9 wherein said diaphragm has multiple edges and said V-shaped groove extends along most of at least two of said edges of said diaphragm.

* * * * *